Figure 1:
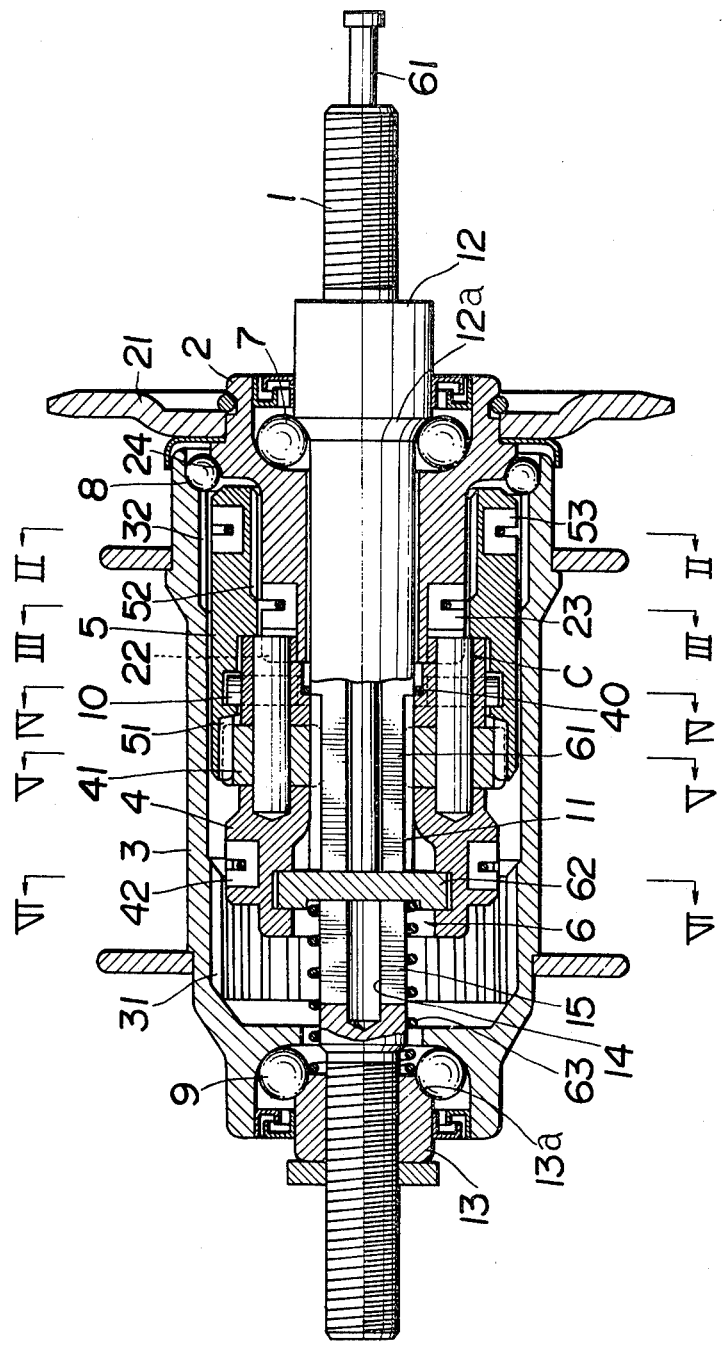

United States Patent [19]

Segawa

[11] 4,069,725
[45] Jan. 24, 1978

[54] THREE SPEED TRANSMISSION HUB

[75] Inventor: Takashi Segawa, Osaka, Japan

[73] Assignee: Shimano Industrial Company Limited, Osaka, Japan

[21] Appl. No.: 650,352

[22] Filed: Jan. 19, 1976

[30] Foreign Application Priority Data

Jan. 23, 1975 Japan .................................. 50-10816
Jan. 7, 1975 Japan .................................. 50-18021

[51] Int. Cl.² ........................ F16H 3/44; F16H 57/10
[52] U.S. Cl. ................................ 74/750 B; 192/6 A; 74/781 B
[58] Field of Search .......... 192/6 A; 74/750 B, 781 B

[56] References Cited

U.S. PATENT DOCUMENTS

| 3,166,171 | 1/1965 | Schwerdhofer et al. | 192/6 A X |
| 3,432,013 | 3/1969 | Matsumoto | 192/6 A |
| 3,608,683 | 9/1971 | Fujisawa | 192/6 A |
| 3,648,809 | 3/1972 | Schwerdhofer | 192/6 A |
| 3,908,807 | 9/1975 | Ozaki et al. | 74/750 B X |
| 3,995,503 | 12/1976 | Schulz | 74/750 B |

Primary Examiner—Samuel Scott
Assistant Examiner—Don E. Ferrell
Attorney, Agent, or Firm—Stevens, Davis, Miller & Mosher

[57] ABSTRACT

A three speed transmission hub for a bicycle, which is adapted to allow a gear frame with planetary gears and a ring gear with inner teeth in mesh with the planetary gears to be axially movable with respect to a hub shaft and is provided between the gear frame and a drive member with a clutch means engageable only in high speed transmission so that the high speed transmission may be exactly carried out. Relay pawls are provided between the ring gear and the drive member through which the drive force can, in medium speed transmission, be conveyed from the drive member to the ring gear exclusive of the gear frame which is thereby relieved.

4 Claims, 9 Drawing Figures

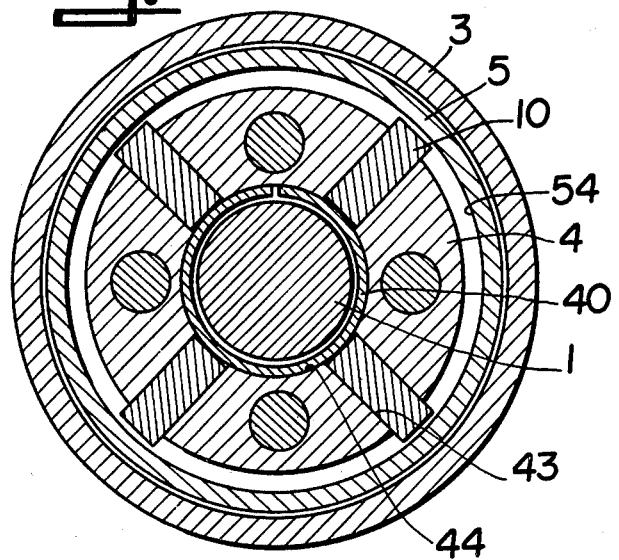
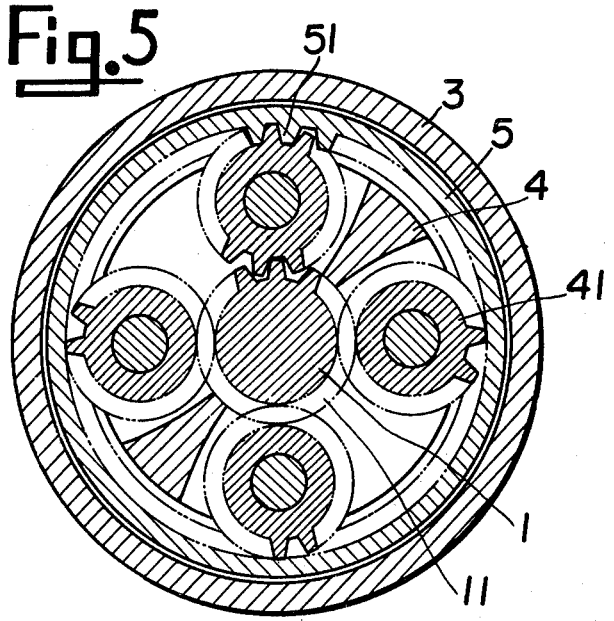

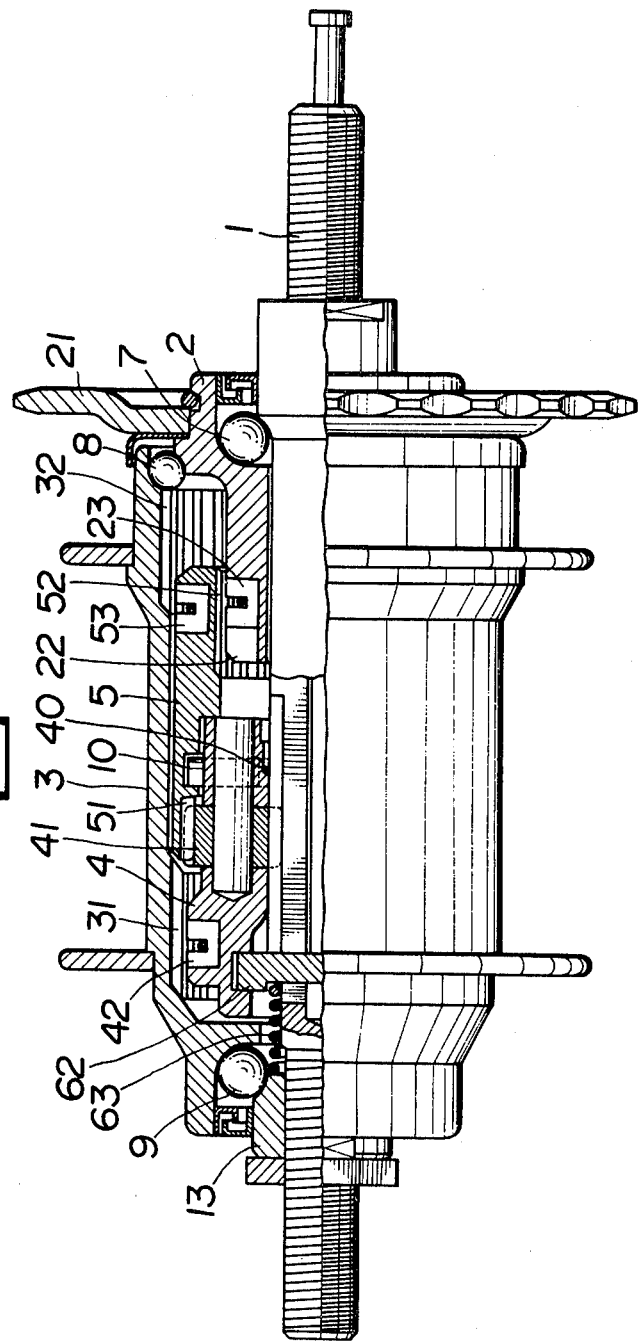

THREE SPEED TRANSMISSION HUB

This invention relates to a three speed transmission hub for a bicycle and more particularly to a three speed transmission hub housing within a hub shell, a hub shaft with a sun gear, a gear frame with planetary gears in mesh with the sun gear, a ring gear having inner teeth in mesh with the planetary gears, and a drive member.

Conventionally, this kind of three speed transmission hub is adapted to shift a gear frame and a ring gear axially of the hub shaft for changing the drive force from a drive member to be transmitted to a hub shell. This kind of speed transmission hub has the following unresolved problems.

First, since the hub is so constructed that the drive member includes two relay pawls through one of which the drive force is, in high speed transmission, conveyed from the drive member to the gear frame and the ring gear and from the latter to the hub shell through high speed transmission pawls, the transmission of large torque at high speed becomes inaccurate, and also the life of the relay pawls is decreased with the result that the hub is, as a whole, of poor lasting quality.

Second, since the drive force from the driving member is, in medium speed transmission, conveyed to the gear frame, which has a weakness in construction caused by attaching planetary gears thereto, and then to the hub shell through the medium and low speed transmission pawls mounted to the gear frame, when subject to over loads the gear frame is constrained with resulting poor durability. Third, such transmission hub is complicated in construction and is hard to assemble or dismantle.

This invention has been designed in view of the aforesaid problems. A main object of the invention is to provide a three speed transmission hub capable of exactly transmitting a drive force to a gear frame in high speed transmission.

Another object of the invention is to provide a three speed transmission hub conveying the drive force from the drive member to a ring gear in the absence of relaying the force with the gear frame so that the gear frame may be relieved.

A further object of the invention is to provide a three speed transmission hub which is simple in construction and easy to assemble or dismantle.

This invention is characterized in that between the gear frame and the drive member is provided a clutch means for relaying therethrough the drive force from the drive member to the gear frame during high speed transmission. Between the drive member and the ring gear are provided relay pawls and ratchet teeth engageable with each other during medium and low speed transmission so that the drive force is transmitted from the drive member to the ring gear through the relay pawls during medium speed transmission. At the gear frame and the ring gear are provided high-speed-transmitting pawls and medium-and-low-speed-transmission pawls respectively and further at both axial sides of a hub shell and provided ratchet teeth in mesh with both transmission pawls respectively.

Figure 6:
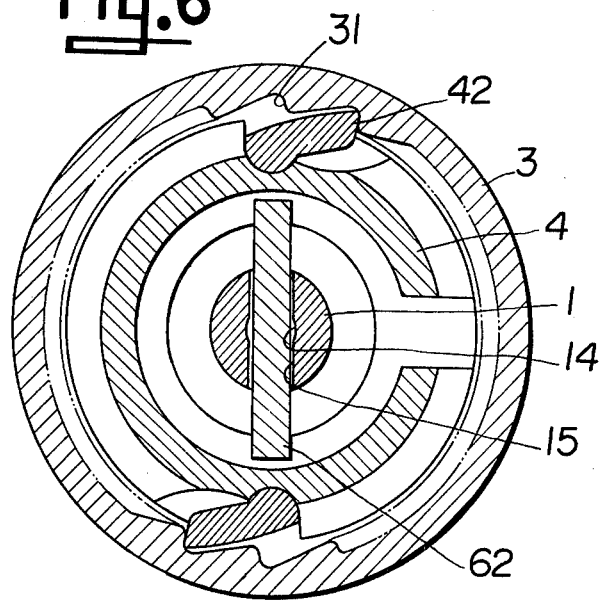
Figure 7:
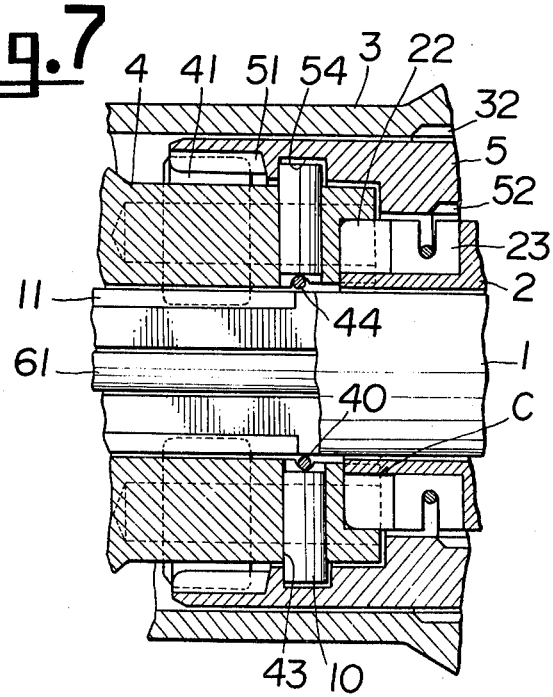
Figure 8:
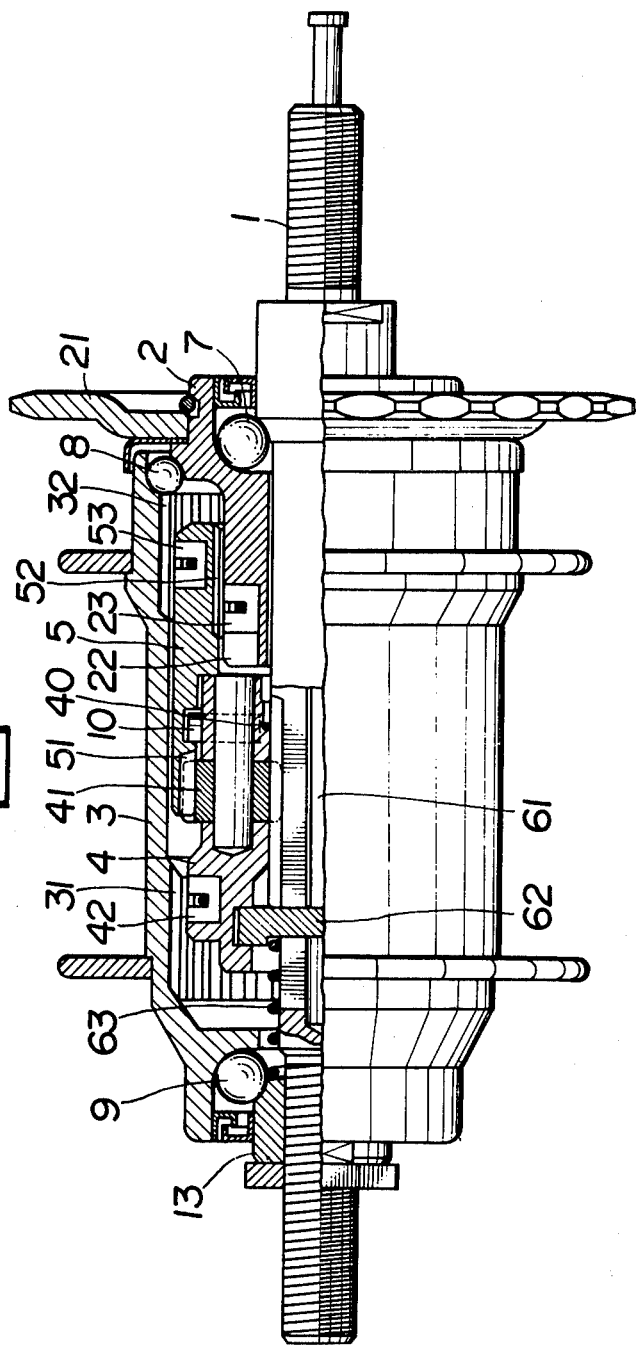

An embodiment of the invention will be detailed in the following description in accordance with the accompanying drawings, in which FIG. 1 is a longitudinal section of a three speed transmission hub in accordance with the invention, FIGS. 2 to 6 are enlarged views thereof taken on Lines II-II, III-III, IV-IV, V-V and VI-VI in FIG. 1 respectively, FIG. 7 is an enlarged longitudinal section of the principal part of the three speed transmission hub in FIG. 1, FIG. 8 is a partially cutaway front view showing the hub in FIG. 1 under the condition changed to the middle speed transmission, and FIG. 9 is a partially cutaway front view thereof under the low speed transmission stage.

A three speed transmission hub of the invention is, as seen from FIG. 1, generally composed of a fixed hub shaft 1, a drive member 2 rotatably mounted on the hub shaft 1, a hub shell 3 rotatably mounted with respect to the drive member 2 and the hub shaft 1, a gear frame 4 having planetary gears 41 and housed in the hub shell 3, a ring gear 5 having inner teeth 51 in mesh with the planetary gears 41, and a control 6 for axially moving the gear frame 4 and the ring gear 5.

The hub shaft 1 is provided at its axially intermediate portion with a sun gear 11 of a given size, always in mesh with the planetary gears 41, at one axial side with an enlarged diameter portion 12 integral with the shaft 1 and having a ball race 12a, and at the other axial side with a screw thread with which is screwed a ball holder 13 having a ball race 13a. The hub shaft 1 is also provided with a center hole extending axially of the hub shaft and accomodating therein a rod 61 of the control 6 and with a groove 15 through which a change key 62 is shifted.

Figure 3:
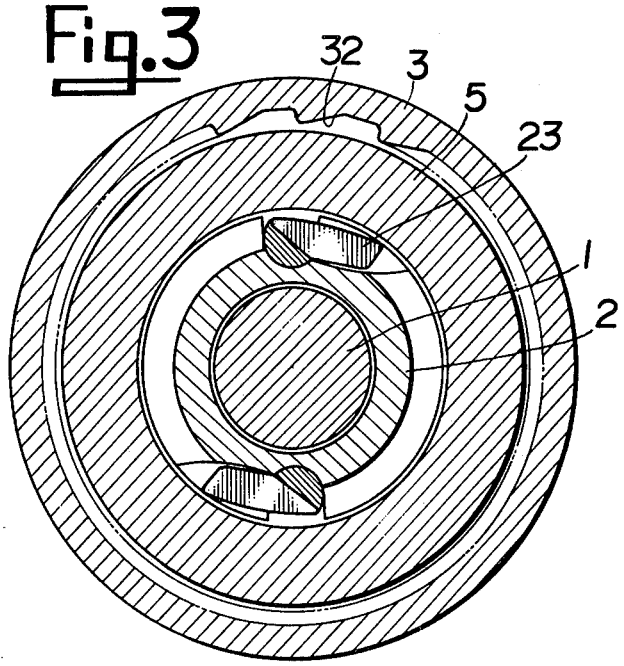

The drive member 2, which is rotatably supported on the hub shaft 1, has at its one end a sprocket wheel 21 fixed thereto and at the other end opposite to one axial end face of the gear frame 4 a clutch 22 which builds up a clutch means c in combination with clutch recesses formed at the aforesaid end face of the gear frame 4, and also at substantially the intermediate portion of the outer periphery, relay pawls 23 as shown in FIG. 3, which are, in medium and low speed transmission, meshed with ratchet teeth 52 of the ring gear 5, to be described hereinafter.

Also, the drive member 2 is provided at the outer periphery of its portion of greatest diameter with a ball race 24 so as to carry, through balls 8 the right side of the hub shell 3 in FIG. 1. The left end of the hub shell 3 is supported to the hub shaft 1 by balls 9 interposed between that end and the ball holder 13. As a result of this structure, the hub shell 3 is rotatably supported at both ends thereof relative to the hub shaft 1 and the drive member 2.

In addition, the hub shell 3 does not have a right and left cup, which are conventionally attached to both ends of the shell. However, ratchet teeth 31, 32 are formed at the inner surface of the hub shell 3. As a result, the hub shell can, as seen from FIG. 1, be easily removed be unscrewing the ball holder 13 so that the gear frame 4 and the ring gear 5 may be uncovered.

Accordingly, in case of failure of the transmitting pawls, to be described hereinafter, formed at the gear frame 4 and the ring gear 5, or in case of failure of the relay pawls 23 on the drive member 2, they can be readily repaired and thereafter easily assembled.

Figure 2:
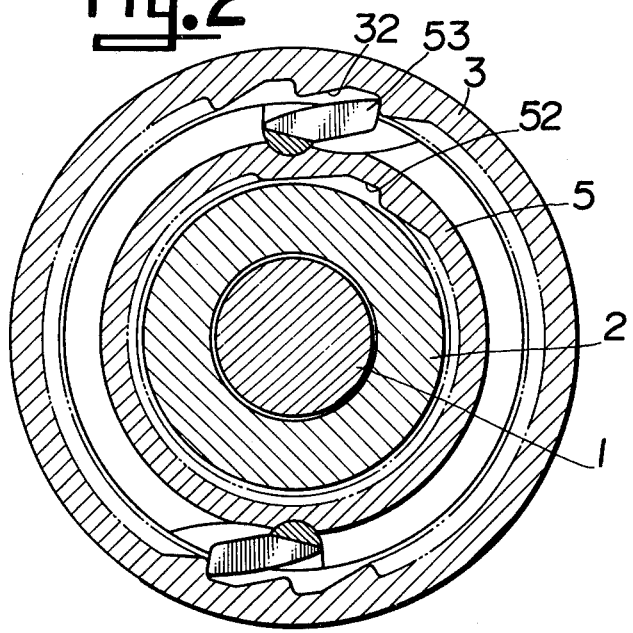

The gear frame 4, which has planetary gears 41, as shown in FIG. 5, is provided at one axial side (the left side) with low-speed-transmitting pawls 42 which are, as shown in FIG. 6, meshed with the ratchet teeth 31 and is provided at the other side (the right side) with the clutch recesses which, as aforesaid, build up the clutch means C. The ring gear 5 is, as shown in FIG. 5, provided with inner teeth 51 in mesh with the planetary gears 41 and with ratchet teeth 52, as shown in FIG. 2, in mesh with the relay pawls 23 at the drive member 2 in medium and low speed transmission. Furthermore, the ring gear 5 has at its outer periphery medium-and high-speed-transmitting pawls 53 in mesh with the ratchet teeth 32 on the hub shell 3.

Both the gear frame 4 and the ring gear 5 are movable axially of the hub shaft 1 by shifting the change key 62 at the control 6 to thereby carry out the gear change.

Furthermore, the gear frame 4 and the ring gear 5 are so constituted as to be freely rotatable relative to each other but axially movable integrally with each other.

Namely, the ring gear 5 is, as shown in FIG. 4, provided at its inner surface with an annular groove 54, and the gear frame 4 is provided at its end portion at the side of the drive member 2 with a plurality of through holes 43 extending radially of the gear frame. Check pins 10 are inserted into the holes 43 from the inside thereof. The check pins 10 are longer than the through holes and extend radially outwardly from the outer periphery of the gear frame 4 to be insertibly engaged in the annular groove 54. The check pins 10 are retained at the internal ends by means of an annular member 40 resiliently abutting against each inner opening of the through holes 43. As a result of this structure, both the gear frame 4 and the ring gear 5 move together axially as a unit.

The annular member 40, which is formed of an elastic wire or a metallic strip to be bent substantially annularly in a diametrically contractive shape, for example a C-like shape, is mounted close to each of the inner openings of the through holes 43 in a manner that at the inner surface of the gear frame 4 is, as shown in FIG. 7, formed an annular groove 44 tracing the center of each inner opening of the through holes 10, into which the annular member 40 is inserted while being diametrically contracted. Thereafter, the member 40 diametrically expands to be in close contact with the annular groove 44 thereby preventing the check pins 10 from escaping inward from the through holes respectively.

Additionally, the annular member 40 need only be sufficiently resilient to hold the check pins 10 from coming out of the through holes and need only have sufficient strength to support the weight of the pins because no centrifugal force is imparted to the member 40 to cause the inward movement thereof. As a result, the member 40 does not have to be very strong. Thus the annular member 40 can be of reduced cross sectional area and weight and therefore easily insertible.

Also, the aforesaid construction of the invention, which includes the annular member 40 inserted into the annular groove 44 at the inner surface of the gear frame 4, aims at making the annular member 40 rigid, where the annular groove 44 may be substituted for an annular notched portion. The check pins 10 are column-shaped and preferably have hemispherical external heads.

This displacement of the gear frame 4 controls the clutch means c in engagement or disengagement, where the planetary gears 41 are always meshed with the sun gear 11 and also the low-speed-transmitting pawls 42 are always in mesh with the ratchet teeth 31.

Furthermore, the displacement of the ring gear 5 controls the relay pawls 23 at the drive member 2 as well as the medium-and high-speed-transmitting pawls 53 in engagement or disengagement. The pawls 53 are in engagement with the ratchet teeth 32 in high speed transmission as shown in FIG. 1 and in medium speed transmission as shown in FIG. 8. However, the pawls 53 are disengaged from the ratchet teeth 32 in low speed transmission. The relay pawls 23 are engaged with the ratchet teeth 52 in medium and low speed transmission and are disengaged therefrom in high speed transmission. In this instance, since the ring gear 5 rotates faster than the drive member 2 when a bicycle moves forward, the relay pawls 23 may be so constructed that they are engaged with the ratchet teeth 52 in high speed transmission. However, when moved backward, the engagement of the relay pawls 23 with the ratchet teeth 52 results in locking thereof; therefore, it is necessary to form the engagement of the clutch means c as slidable in reverse rotation so as to disengage the pawls 23 from the ratchet 52.

Even when the relay pawls 23 are in mesh with the ratchet teeth 52 in middle and low speed transmission, it is necessary to engage the relay pawls 23 with the ratchet teeth 52 prior to release of the clutch means c to prevent the drive member 2 from idling. In this case, when the bicycle moves backward, locking also occurs as aforesaid so that the engagement of the clutch means c should be slidable.

Referring to the drawings, the numeral reference 63 denotes a coil spring mounted between the ball holder 13 and the change key 62 of the control 6. The spring 63 biasses the gear frame 4 and the ring gear 5 toward the drive member 2 through the change key 62.

The three speed transmission hub of the invention is constructed as aforesaid. The function thereof will now be described. Referring to FIG. 1, the transmission hub is in the high speed transmitting condition, in which the change key 62 in the far right position allows the gear frame 4 and the ring gear 5 to be located in the far right position and the clutch means c to be interposed between the gear frame 4 and the drive member 2.

In this condition, the drive force from the drive member 2 is transmitted in the order of the clutch means c, the gear frame 4, the planetary gears 41 and the ring gear 5, and the increase in rotary speed to be transmitted to the hub shell 3 through the engagement of the ratchet 32 with the medium-and high-speed-transmitting pawls 53 formed on the ring gear 5.

In addition, in the high speed transmission, the relay pawls 23 on the drive member 2 are, as aforesaid, disengaged from the ratchet teeth 52 at the ring gear 5, while, the low-speed-transmitting pawls 42, which are in engagement with the ratchet teeth 31 at the hub shell 3, are idle because the hub shell rotates faster than the gear frame 4 and no power transmission is effected by the engagement of the pawls 42 with the ratchet teeth 31.

Next, for changing from the high speed transmission to the medium speed transmission, the rod 61 is controlled to shift the change key 62 axially to the left so that the gear frame 4 and the ring gear 5 are displaced as indicated in FIG. 8. As a result, the clutch means c is released and the relay pawls 23 are brought into engagement with the ratchet teeth 52 at the ring gear 5.

As a result, the drive force from the drive member 2 is transmitted to the ring gear 5 through the relay pawls 23 and then to the hub shell 3 in a ratio of 1 to 1 of the rotary speed through the medium-and high-speed-transmitting pawls 53 at the ring gear 5.

In addition, in the medium speed transmission, the ring gear 5 rotates to partially transmit the drive force to the gear frame 4 through the planetary gears 41 so as to allow the gear frame to be rotated, where the latter is reduced in rotary speed less than the ring gear 5 so that the low-speed-transmitting pawls 42 are, even when engaged with the ratchet teeth 31, idle in the absence of transmitting the drive force therethrough as in the high speed transmission.

At the aforesaid middle speed transmission, the drive force is transmitted to the hub shell 3 in a route of the drive member 2 — the relay pawls 23 — the ring gear 5 — the transmission pawls 53 — the hub shell 3, i.e., the gear frame 4 is omitted as aforesaid. Accordingly, the gear frame 4, which is weak in overall strength owing to provision of the planetary gears thereon, is not required to bear overstrain imparted thereto thereby increasing the durability of the gear frame 4.

Next, the gear change from middle speed to low speed is carried out by controlling the rod 61 to shift the high speed change key 62 further axially leftward so that the gear frame 4 and the ring gear 5 are moved to the position shown in FIG. 9. As a result, the ratchet teeth 32 are disengaged from the middle-and high-speed transmitting pawls 53 at the ring gear 5, and the drive force is conveyed from the drive member 2 to the ring gear 5 through the relay pawls 23, and to the gear frame 4 through the planetary gears 41 and then reduced to be transmitted to the hub shell 3 through the low-speed-transmitting pawls 42 at the gear frame 4.

As is clearly understood from the aforesaid description, the three speed transmission hub in accordance with the invention includes the clutch means between the gear frame and the drive member, through which clutch means the drive force is transmitted from the drive member to the gear frame, whereby the transmission is constantly more exact in comparison with a conventional transmission through the relay pawls. Also, the transmission hub can be simple in construction and easy to assemble or dismantle.

Also, the transmission hub includes the relay pawls provided on the drive member, which are adapted to mesh with the ratchet teeth provided on the ring gear during the medium and low speed transmission, so that the drive force is, in the medium speed transmission, transmitted from the drive member to the ring gear and then to the hub shell through the medium-and high-speed transmitting pawls exclusive of the structurally weak gear frame. As a result, the transmission hub of the invention has increased durability in comparison with a conventional one transmitting the drive force to the gear frame and then to the hub shell through the transmitting pawls at the gear frame.

Furthermore, the transmission hub employs the clutch means for the high speed transmission and the relay pawls for conveying therethrough the drive force from the drive member to the ring gear during the medium speed transmission so that the low-, medium- and high-speed-transmitting pawls and the relay pawls as well may have a common shape; thus, it is to that extent expected to make the transmission hub inexpensive to manufacture.

While the form of embodiment of the invention as herein described constitutes a preferred form, it is to be understood that other forms might be adapted, all coming within the scope of the claims which follow.

What is claimed is:

1. A three speed transmission hub for a bicycle, comprising; a hub shaft with a sun gear; a gear frame having planetary gears always in mesh with said sun gear and supported in a relation of being rotatable and axially movable with respect to said hub shaft; a ring gear including inner teeth always in mesh with said planetary gears at said gear frame and adapted to be movable together with said gear frame in the axial direction of said hub shaft; a drive member having a sprocket wheel and rotatably supported to said hub shaft; a hub shell rotatably supported to said drive member and said hub shaft; and a control for axially moving said gear frame and ring gear, said gear frame being provided with low-speed-transmitting pawls, said ring gear being provided with medium-and high-speed-transmitting pawls, said hub shell being provided at the inner surface of axially both ends thereof with ratchet teeth engageable with said low-speed-transmitting pawls and said medium-and high-speed transmitting pawls respectively, between said drive member and said gear frame being provided a clutch means engageable only in the high speed transmission, and between said drive member and said ring gear being relay pawls and ratchet teeth in mesh with each other at least in the medium and the low speed transmission.

2. The three speed transmission hub as set forth in claim 1, wherein said clutch means employs a clutch conveying the drive force from said drive member to said gear frame only when said drive member is normally rotated and being slidable when said drive member is reversely rotated.

3. The three speed transmission hub as set forth in claim 1, wherein said gear frame is provided with a plurality of through holes extending radially of the gear frame and with an annular groove at the inner surface thereof so that said through holes are inserted with check pins respectively in the relationship that said annular groove may be insertibly engaged with each external one end of said check pins, wherein said gear frame and said ring gear are made movable in the axial direction thereof.

4. The three speed transmission hub as set forth in claim 1, wherein an annular elastic member is elastically abutted against each of internal ends of said check pins inserted into said through holes.

* * * * *

UNITED STATES PATENT AND TRADEMARK OFFICE
CERTIFICATE OF CORRECTION

PATENT NO. : 4,069,725
DATED : January 24, 1978
INVENTOR(S) : Takashi SEGAWA

It is certified that error appears in the above-identified patent and that said Letters Patent are hereby corrected as shown below:

On the cover page containing the Abstract, under Foreign Application Priority Data, change the filing date of Japanese Application No. 50-18021 from January 7, 1975 to February 7, 1975.

Signed and Sealed this

Sixth Day of June 1978

[SEAL]

Attest:

RUTH C. MASON
*Attesting Officer*

DONALD W. BANNER
*Commissioner of Patents and Trademarks*